(12) United States Patent
Nishikawa et al.

(10) Patent No.: US 7,027,170 B1
(45) Date of Patent: Apr. 11, 2006

(54) PRINTING CONTROL SYSTEM FOR SEPARATION PRINTING

(75) Inventors: Satoshi Nishikawa, Yokohama (JP); Koji Nakagiri, Kawasaki (JP); Yasuo Mori, Tokyo (JP); Yasuhiro Kujirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/470,204

(22) Filed: Dec. 22, 1999

(30) Foreign Application Priority Data

Dec. 22, 1998 (JP) ............................ 10-365513

(51) Int. Cl.
  *G06K 15/00* (2006.01)
  *G06K 1/00* (2006.01)
(52) U.S. Cl. ..................... 358/1.15; 358/1.16
(58) Field of Classification Search ............... 358/1.15, 358/1.11, 1.12, 1.13, 1.14, 1.16, 1.17, 1.9, 358/1.1
See application file for complete search history.

(56) References Cited

U.S. PATENT DOCUMENTS

| | | | | |
|---|---|---|---|---|
| 5,124,731 A | * | 6/1992 | Knodt et al. | 347/129 |
| 5,177,543 A | * | 1/1993 | Rodenberg et al. | 399/224 |
| 5,282,050 A | * | 1/1994 | Ishizuka et al. | 358/400 |
| 5,442,732 A | * | 8/1995 | Matysek et al. | 358/1.17 |
| 5,481,353 A | * | 1/1996 | Hicks et al. | 399/382 |
| 5,566,278 A | * | 10/1996 | Patel et al. | 358/1.15 |
| 5,709,374 A | * | 1/1998 | Taylor et al. | 270/1.02 |
| 5,749,024 A | * | 5/1998 | Young | 399/85 |
| 5,869,824 A | * | 2/1999 | Okada et al. | 235/380 |
| 6,104,498 A | * | 8/2000 | Shima et al. | 358/1.14 |
| 6,362,892 B1 | * | 3/2002 | Lee et al. | 358/1.13 |
| 6,377,356 B1 | * | 4/2002 | Sakamoto et al. | 358/1.14 |

* cited by examiner

*Primary Examiner*—Gabriel Garcia
*Assistant Examiner*—Thierry L. Pham
(74) *Attorney, Agent, or Firm*—Fitzpatrick, Cella, Harper & Scinto

(57) ABSTRACT

This invention relates to a printing device control method capable of outputting data while inserting separation paper between OHP sheets when it is undesirable for OHP sheets or the like that output results overlap each other. When an output order flag representing the printing order is set, and a separation printing function is set, the output order flag value is checked (S603). For backward printing, separation page output processing (S606) is performed before page data spool processing (S607). For forward printing, page data spool processing (S604) is performed before separation page output processing (S605). This makes it possible to normally output separation paper regardless of the printing order. When a printing device has a blank paper saving function, and printing on separation sheet is set off, the blank paper saving function can be invalidated to normally output separation paper.

6 Claims, 7 Drawing Sheets

PRINTING CONTROL SYSTEM FOR SEPARATION PRINTING

BACKGROUND OF THE INVENTION

1. Field of the Invention

The present invention relates to a separation paper insertion printing processing method and apparatus and, more particularly, to a separation paper insertion printing processing method and apparatus in a system having a printer and an information processing apparatus such as a personal computer.

2. Description of the Related Art

There is conventionally known a printing control method having a separation paper insertion function. According to this separation paper insertion function, when a system having a printer and an information processing apparatus such as a personal computer is to print data on media such as OHP films for which it is undesirable that output results overlap each other, the system prints data while inserting separation paper, which functions to prevent the output results from overlapping each other and also functions as layout paper or anti-offset paper.

Depending on settings, the same contents as those of a corresponding OHP film can be printed on separation paper, or separation paper can be output as blank paper.

Also, there is a printing control method having a blank paper saving function of saving paper by not printing pages having no print data.

However, the printing control method having the conventional separation paper insertion function does not consider any output order of prints. Thus, even if a printer system can perform backward printing (start printing data from the final page) considering face-up discharge printing, it cannot select whether to print separation paper before or after an output page of a corresponding OHP film.

The conventional blank paper saving function may be used together with the separation paper insertion function. In this case, however, when an output page having no print data exists such that separation paper is set not to be printed by the separation paper insertion function, the blank paper saving function is effected not to allow normal separation paper insertion printing.

The present invention has been made to overcome the conventional drawbacks, and has as its object to provide a printing control method capable of normally inserting separation paper regardless of a designated printing order.

It is another object of the present invention to provide a printing control method capable of normally inserting separation paper even when both the blank paper saving function and separation paper insertion function are used.

SUMMARY OF THE INVENTION

More specifically, according to an aspect of the present invention, there is provided a printing control method of controlling a printing device to output predetermined data onto a printing medium, comprising the separation printing check step of checking a separation printing setting, set in advance, representing whether a predetermined medium is additionally output over each page of the output, the printing order check step of checking a printing order setting, set in advance, representing whether the predetermined data is output from a final page or first page, and the control step of, when the separation printing setting is set to additionally output the predetermined medium and the printing order setting is set to output the predetermined data from the first page, controlling to output each page of the output and then additionally output the predetermined medium before a next page is output, and when the separation printing setting is set to additionally output the predetermined medium and the printing order setting is set to output the predetermined data from the final page, controlling to additionally output the predetermined medium before each page of the output is output.

According to another aspect of the present invention, there is provided a printing control apparatus for controlling a printing device to output predetermined data onto a printing medium, comprising separation printing check means for checking a separating printing setting, set in advance, representing whether a predetermined medium is additionally output over each page of the output result, printing order check means for checking a printing order setting, set in advance, representing whether the predetermined data is output from a final page or first page, and control means for, when the separation printing setting is set to additionally output the predetermined medium and the printing order setting is set to output the predetermined data from the first page, controlling to output each page of the output result and then additionally output the predetermined medium before a next page is output, and when the separation printing setting is set to additionally output the predetermined medium and the printing order setting is set to output the predetermined data from the final page, controlling to additionally output the predetermined medium before each page of the output result is output.

According to still another aspect of the present invention, there is provided a storage medium storing a program which can be executed by an apparatus, wherein the apparatus which executes the program is operated as a printing control apparatus for controlling a printing device to output predetermined data onto a printing medium, the printing control apparatus having separation printing check means for checking a separating printing setting, set in advance, representing whether a predetermined medium is additionally output over each page of the output result, printing order check means for checking a printing order setting, set in advance, representing whether the predetermined data is output from a final page or first page, and control means for, when the separation printing setting is set to additionally output the predetermined medium and the printing order setting is set to output the predetermined data from the first page, controlling to output each page of the output result and then additionally output the predetermined medium before a next page is output, and when the separation printing setting is set to additionally output the predetermined medium and the printing order setting is set to output the predetermined data from the final page, controlling to additionally output the predetermined medium before each page of the output result is output.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 1:
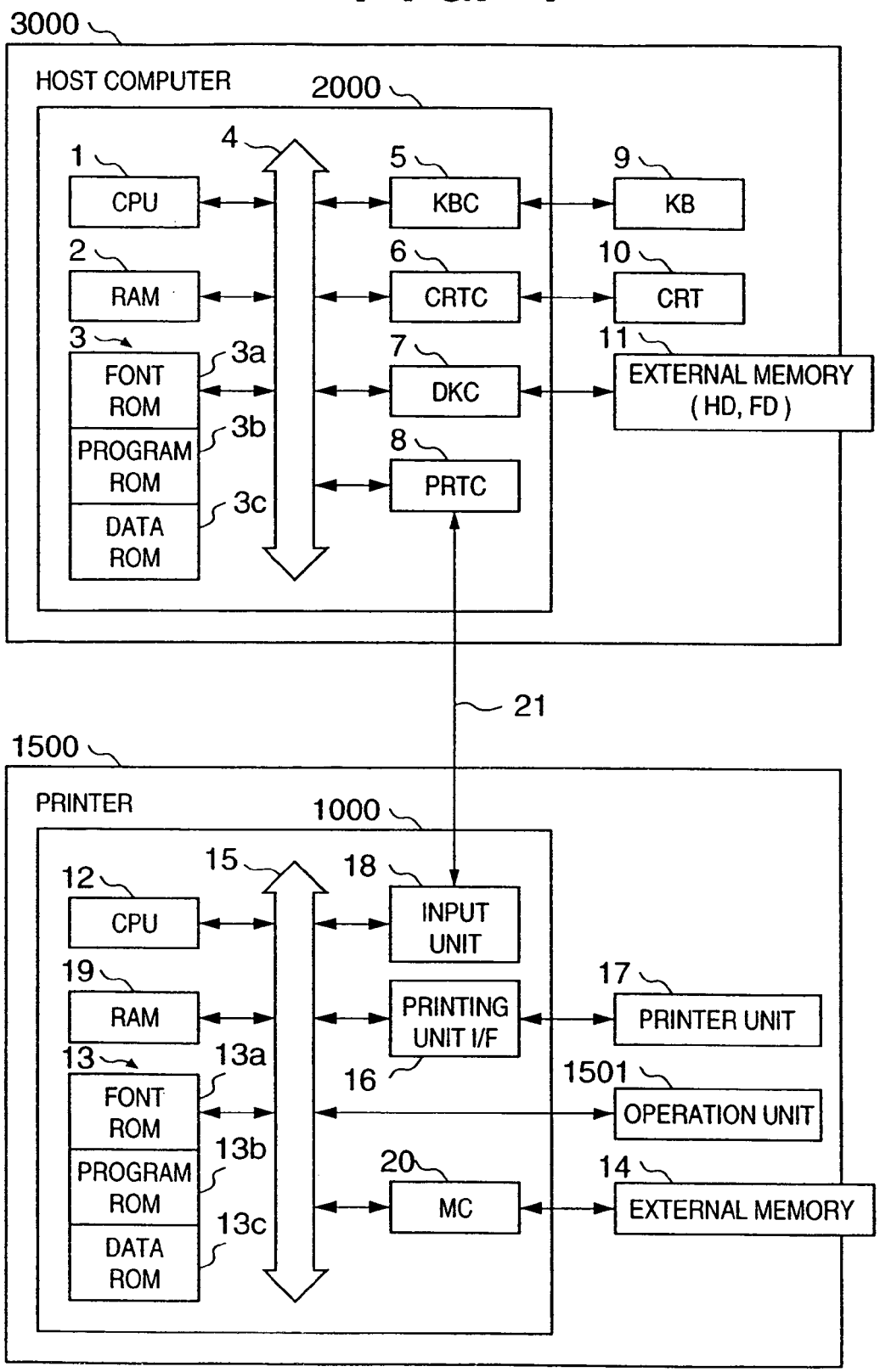
FIG. 1 is a block diagram showing an arrangement of an information processing system according to an embodiment of the present invention.

Several preferred embodiments of the present invention will be described below with reference to the accompanying drawings.

The arrangement of an information processing system according to the first embodiment of the present invention will be explained with reference to the block diagram of FIG. 1. As far as the functions of the present invention are executed, the present invention may be applied to a single device, a system constituted by a plurality of devices, or a system which performs processing while being connected via a network such as a LAN (Local Area Network) or WAN (Wide Area Network).

The information processing system according to the first embodiment is constituted by a host computer 3000 and printer 1500. The host computer 3000 comprises a CPU 1, RAM 2, ROM 3, keyboard controller (KBC) 5, CRT controller (CRTC) 6, disk controller (DKC) 7, printer controller (PRTC) 8, keyboard (KB) 9, CRT display (CRT) 10, and external memory 11. The keyboard 9 is generally connected to a pointing device such as a mouse, tablet, or joystick.

The structures of the respective components of the host computer 3000 will be first described in detail. The CPU 1 is a central processing unit for integrally controlling respective devices connected to a system bus, and executes processes for documents comprising figures, images, characters, tables (including spreadsheets and the like), and the like on the basis of document processing programs stored in a program ROM 3b of the ROM 3 or the external memory 11. The CPU 1 executes, e.g., mapping (rasterizing) processing of an outline font to a display information RAM set on the RAM 2, and enables WYSIWYG (What You See Is What You Get: a function capable of obtaining a print output with a size and shape displayed on a CRT display screen) on the CRT display 10.

Further, the CPU 1 opens various windows registered in advance and executes various data processes on the basis of commands instructed with a mouse cursor (not shown) on a GUI or the like displayed on the CRT display 10. When a user is to print data using the printer 1500, he/she can open a window concerning printing settings to set a printing processing method for a printer driver including settings of the printer 1500 and selection of a printing mode.

The RAM 2 functions as a main memory, work area, and the like for the CPU 1. The ROM 3 comprises a font ROM 3a, the program ROM 3b, and a data ROM 3c. The font ROM 3a or external memory 11 stores font data and the like used in document processing. The program ROM 3b or external memory 11 stores an operating system (to be referred to as an OS) and the like as control programs of the CPU 1. The data ROM 3c or external memory 11 stores various data used in document processing and the like.

The keyboard controller (KBC) 5 controls inputs from the keyboard 9 and pointing device (not shown). The CRT controller (CRTC) 6 controls display on the CRT display (CRT) 10. The disk controller (DKC) 7 controls access to the external memory 11. The printer controller (PRTC) 8 is connected to the printer 1500 via a bidirectional interface 21, and executes communication control processing with the printer 1500. The keyboard 9 has various keys. The CRT display (CRT) 10 displays figures, image characters, tables, and the like.

The external memory 11 is realized by a hard disk (HD), floppy disk (FD), magneto-optical disk (MO), and the like, and stores boot programs, various applications, font data, user files, edit files, printer control command generation programs (printer drivers), and the like. The above-described CPU 1, RAM 2, ROM 3, keyboard controller (KBC) 5, CRT controller (CRTC) 6, disk controller (DKC) 7, and printer controller (PRTC) 8 are arranged on a computer control unit 2000.

The structures of the respective components of the printer 1500 will be described in detail. A CPU 12 is a central processing unit for integrally controlling respective devices connected to a system bus 15, and outputs image signals as output information to a printer unit (printer engine) 17 on the basis of control programs and the like stored in a program ROM 13b (to be described below) of a ROM 13 or control programs and the like stored in an external memory 14. The CPU 12 can communicate with the host computer 3000 via an input unit 18, and can notify the host computer 3000 of internal information of the printer 1500 and the like. A RAM 19 functions as a main memory, work area, and the like for the CPU 12, and the memory capacity of the RAM 19 can be expanded by an option RAM (not shown) to be connected to an expansion port.

Note that the RAM 19 is used as an output information mapping area, environment data storage area, NVRAM, and the like. The ROM 13 comprises a font ROM 13a, the program ROM 13b, and a data ROM 13c. The font ROM 13a stores font data and the like used to generate output information. The program ROM 13b stores control programs and the like for the CPU 12. The data ROM 13c stores information used in the host computer 3000 when the external memory 14 such as a hard disk is not connected to the printer 1500.

The input unit 18 allows exchanging data between the printer 1500 and host computer 3000 via the bidirectional interface 21. A printing unit interface (I/F) 16 allows exchanging data between the CPU 12 and printer unit 17. A memory controller (MC) 20 controls access to the external memory 14. The printer unit 17 performs printing operation under the control of the CPU 12. An operation unit 1501 comprises switches for various operations, display means (e.g., a liquid crystal panel display or LED display), and the like. The external memory 14 is realized by a hard disk (HD), IC card, and the like, and is optionally connected to the printer 1500.

The external memory 14 stores font data, emulation programs, form data, and the like, and is accessed under the control of the memory controller (MC) 20. Note that the external memory 14 is not limited to one, and the printer 1500 can use a plurality of external memories 14. That is, the printer 1500 can be connected to a plurality of external memories 14 such as an optional card in addition to internal fonts, and an external memory storing programs for interpreting different printer control languages. Further, the printer 1500 may adopt an NVRAM (not shown) to store printer mode setting information from the operation unit 1501.

The above-described CPU 12, RAM 19, ROM 13 input unit 18, printing unit interface (I/F) 16, and memory controller (MC) 20 are arranged on a printer control unit 1000. In this embodiment, the printing control method of the present invention is stored in, e.g., the external memory 11 as software executed by the CPU 1 of the host computer 3000.

Figure 2:
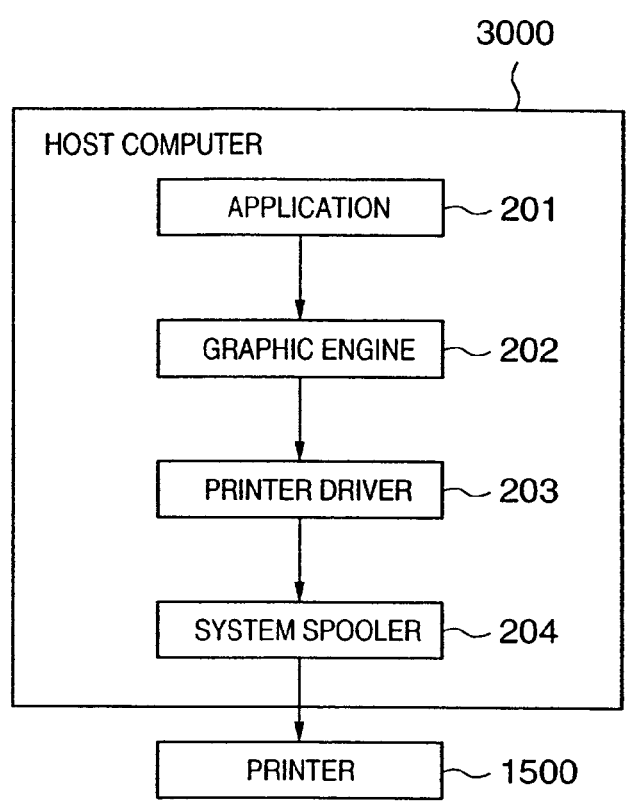
FIG. 2 is a block diagram showing the flow of a typical printing sequence in a host computer connected to a printer.

FIG. 2 is a block diagram showing the flow of typical printing processing in the host computer connected to a printing apparatus, such as a printer, directly or via a network. In FIG. 2, an application 201 for creating a document to be printed, graphic engine 202, printer driver 203, and system spooler 204 exist as files stored in the external memory 11 in FIG. 1, and serve as program modules executed by loading them to the RAM 2 by an OS or modules using these modules in execution. The application 201 and printer driver 203 can be additionally stored in an HD serving as an external memory 11 from an FD or CD-ROM serving as another external memory 11 or via a network (not shown).

The application 201 stored in the external memory 11 is loaded to the RAM 2 and then executed. In printing data from the application 201 by the printer 1500, data is output (drawn) using the graphic engine 202 which is similarly loaded to the RAM 2 and can be executed. The graphic engine 202 similarly loads, from the external memory 11 to the RAM 2, the printer driver 203 installed from the host computer 3000 in advance for each usable printing apparatus, and sets an output from the application 201 to the printer driver 203. The graphic engine 202 transforms a GDI (Graphic Device Interface) function received from the application 201 into a DDI (Device Driver Interface) function, and outputs the DDI function to the printer driver 203.

Based on the DDI function received from the graphic engine 202, the printer driver 203 converts a printing instruction into a control command such as a PDL (Page Description Language) the printer can recognize. The converted printer control command is output as print data to the printer 1500 through the bidirectional interface 21 via the system spooler 204 loaded to the RAM 2 by the OS.

Figure 3:
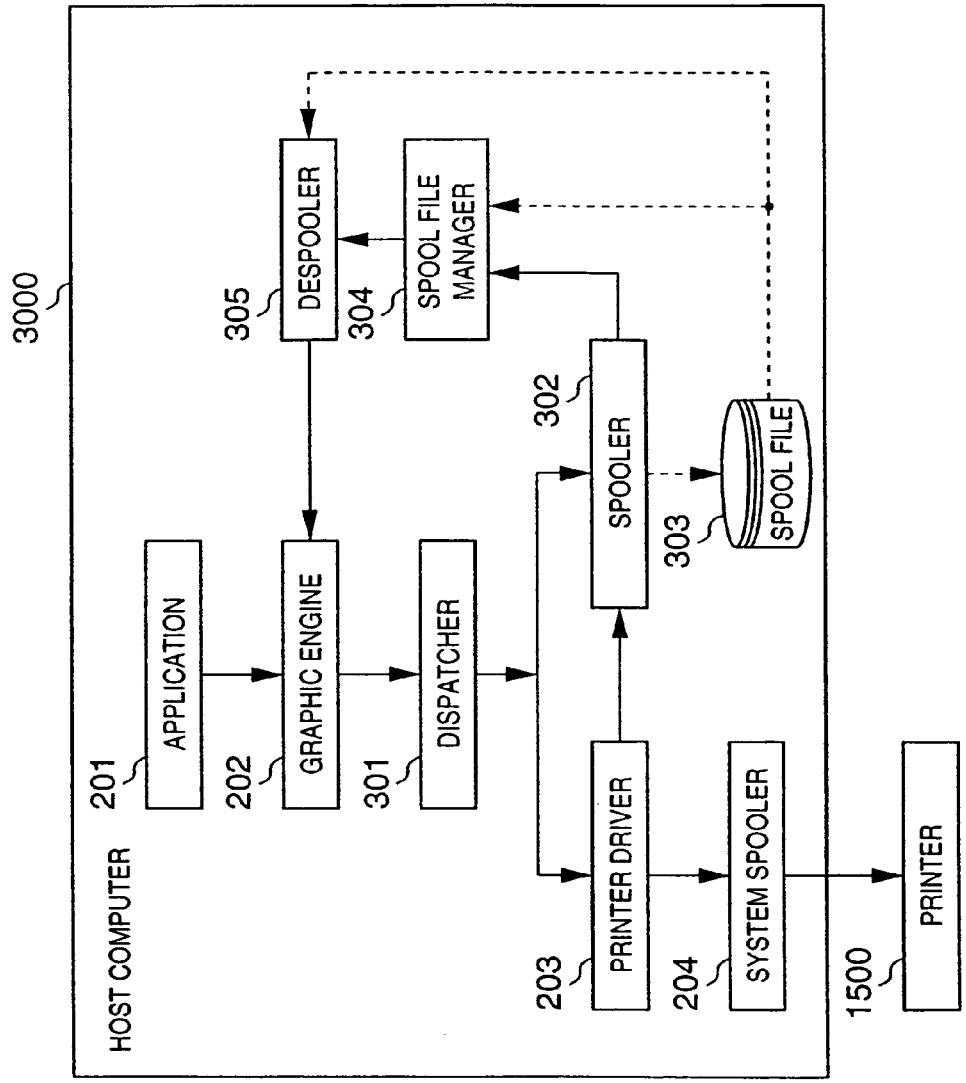
FIG. 3 is a block diagram showing an arrangement in which an arrangement concerning an intermediate code spool function is added to the arrangement of FIG. 2.

The information processing system according to the first embodiment has the arrangement made up of the printer 1500 and host computer 3000 shown in FIGS. 1 and 2, and in addition an arrangement of temporarily spooling print data from an application by intermediate code data, as shown in FIG. 3. FIG. 3 shows an expanded arrangement of the system in FIG. 2 in which a spool file 303 made up of intermediate codes is temporarily generated in transmitting a printing instruction from the graphic engine 202 to the printer driver 203. Note that arrows in FIG. 3 indicate a main data flow concerning printing. In practice, information is exchanged bidirectionally between components.

A dispatcher 301, spooler 302, spool file manager 304, and despooler 305 added to the arrangement of FIG. 3 in the first embodiment are respectively stored as program module files in the external memory 11, and loaded to the RAM 2 and executed by an OS or another program module in execution. The spool file 303 is assigned to a predetermined area in, e.g., the external memory 11.

In the system of FIG. 2, the application 201 is released from printing processing after the printer driver 203 converts all printing instructions from the graphic engine 202 into control commands for the printer 1500. To the contrary, in the system of FIG. 3, the application 201 is released from printing processing after the spooler 302 converts all printing instructions into intermediate code data and outputs the intermediate code data to the spool file 303. In general, the processing time is shorter in the latter system.

The system shown in FIG. 3 can process the contents of the spool file 303. This can realize a function other than the function of the application, such as enlargement/reduction of print data from the application, and N-up printing of reducing and printing a plurality of pages onto one page. In backward printing, since print data must be generally accumulated to the last, the spool file 303 is normally created. For this purpose, the system of FIG. 2 is expanded to spool intermediate code data, as shown in FIG. 3.

To process print data, a user performs settings from a window constituting a GUI provided in advance by the printer driver 203, and the printer driver 203 stores the set contents in the RAM 2 or external memory 11.

Details in FIG. 3 will be explained. As shown in FIG. 3, in this expanded processing system, the dispatcher 301 receives a printing instruction from the graphic engine 202. When the printing instruction received by the dispatcher 301 from the graphic engine 202 is one issued from the application 201 to the graphic engine 202, the dispatcher 301 loads the spooler 302 stored in the external memory 11 to the RAM 2, and transmits the printing instruction not to the printer driver 203 but to the spooler 302.

The spooler 302 converts the received printing instruction into intermediate codes, and outputs them to the spool file 303. Also, the spooler 302 obtains process settings concerning print data set in the printer driver 203 from the RAM 2 or external memory 11 via the printer driver 203, and stores the settings in the spool file 303. Note that the spool file 303 is generated as a file in the external memory 11, but may be generated in the RAM 2. Further, the spooler 302 loads the spool file manager 304 stored in the external memory 11 to the RAM 2, and notifies the spool file manager 304 of the generation status of the spool file 303.

The spool file manager 304 determines whether print data stored in the spool file 303 can be printed in accordance with the contents of the process settings. When the spool file manager 304 determines that the print data can be printed using the graphic engine 202, the spool file manager 304 loads the despooler 305 stored in the external memory 11 to the RAM 2, and instructs the despooler 305 to perform printing processing of the intermediate codes described in the spool file 303.

The despooler 305 processes the intermediate codes included in the spool file 303 in accordance with the contents of the process settings included in the spool file 303, and outputs the processed codes via the graphic engine 202 again. When the printing instruction received by the dispatcher 301 from the graphic engine 202 is one issued from the despooler 305 to the graphic engine 202, the dispatcher 301 transmits a printing instruction not to the spooler 302 but to the printer driver 203. The printer driver 203 generates a printer control command and outputs it to the printer 1500 via the system spooler 204.

(Structure of Printer)

Figure 5:
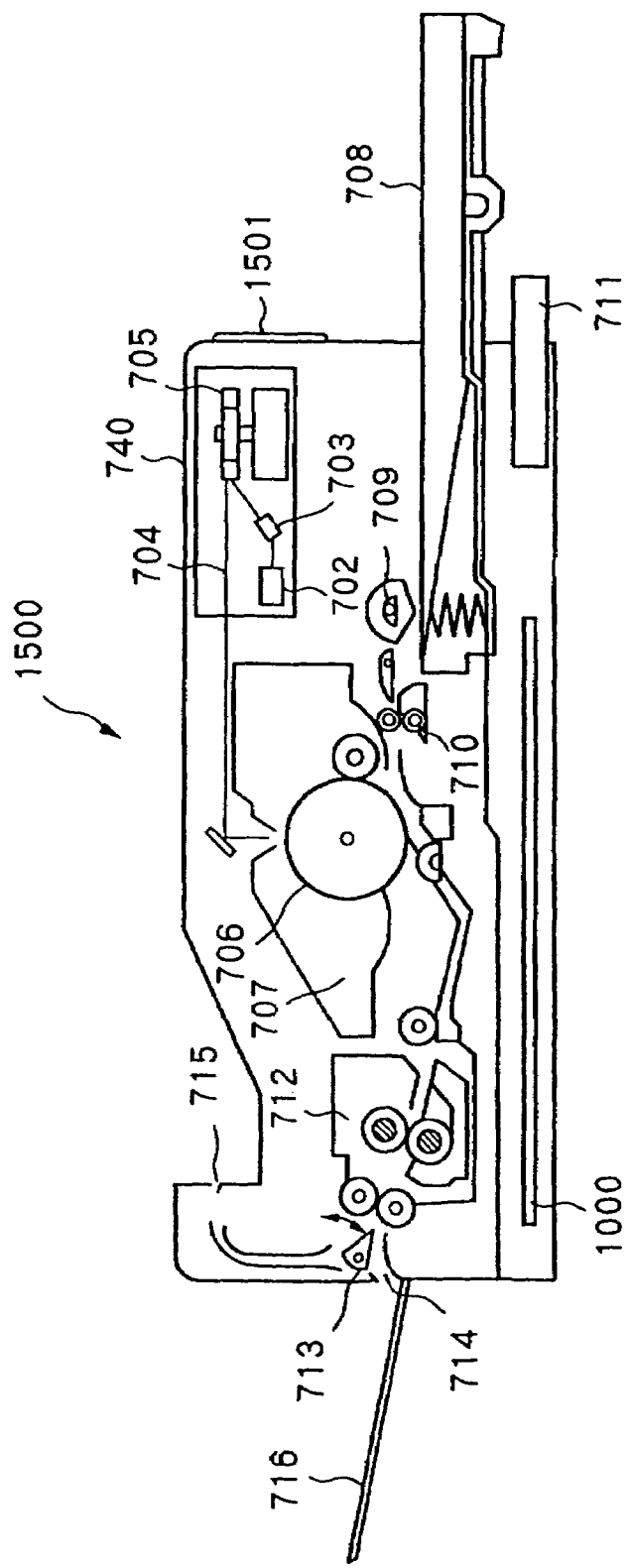
FIG. 5 is a sectional view showing the internal structure of a laser beam printer.

FIG. 5 is a sectional view showing the internal structure of a laser beam printer (to be referred to as an LBP hereinafter) as an example of the printer 1500 according to the first embodiment. When the LBP is employed as the printer 1500, the LBP can receive character pattern data and the like and printing them on printing paper.

In the printer 1500, an LBP main body 740 for forming an image on printing paper serving as a printing medium based on a supplied printer control command and the like comprises the printer control unit 1000, the operation unit 1501, a laser driver 702, a semiconductor laser 703, a rotary polygon mirror 705, an electrostatic drum 706, a developing unit 707, a sheet cassette 708, convey rollers 710, an external memory 711, a face-down discharge portion 715, and delivery tray 716.

The structures and operations of the respective components will be described in detail. The printer control unit 1000 controls the whole LBP main body 740 and analyzes character pattern information and the like. The printer control unit 1000 mainly converts a printer control command into a video signal, and outputs the signal to the laser driver 702. The printer control unit 1000 can be connected to the external memory 711 for supplying font data, the emulation program of a page description language, and the like. The operation unit 1501 has operation switches, display means (e.g., an LED display), and the like, as described above.

The laser driver 702 is a circuit for driving the semiconductor laser 703, and turns on/off a laser beam 704 emitted by the semiconductor laser 703 in accordance with an input video signal. The semiconductor laser 703 emits a laser beam to the rotary polygon mirror 705. The rotary polygon mirror 705 reflects the laser beam 704 to the right and left to scan the electrostatic drum 706. Scanning of the laser beam 704 forms an electrostatic latent image of a character pattern on the surface of the electrostatic drum 706.

The developing unit 707 surrounds the electrostatic drum 706, and develops the electrostatic latent image. A developing material such as a toner which developed the latent image is transferred onto printing paper. The sheet cassette 708 stores, e.g., cut sheets as printing paper. A pickup roller 709 and the convey rollers 710 feed a printing cut sheet in the sheet cassette 708 into the LBP main body 740, and supply the sheet to the electrostatic drum 706. In this case, a printing cut sheet can also be supplied from a manual feed tray (not shown) attached to the upper surface of the lid of the sheet cassette 708. A fixing unit 712 heats a toner image transferred to a printing cut sheet to fix the image onto the printing cut sheet. When a switching wedge 713 is switched up, the printing sheet having the image is discharged from a face-up discharge portion 714 to the delivery tray 716 with the print surface facing up. When the wedge 713 is switched down, the print sheet is discharged from the face-down discharge portion 715 with the print surface facing down.

(Operation of Despooler)

Figure 4:
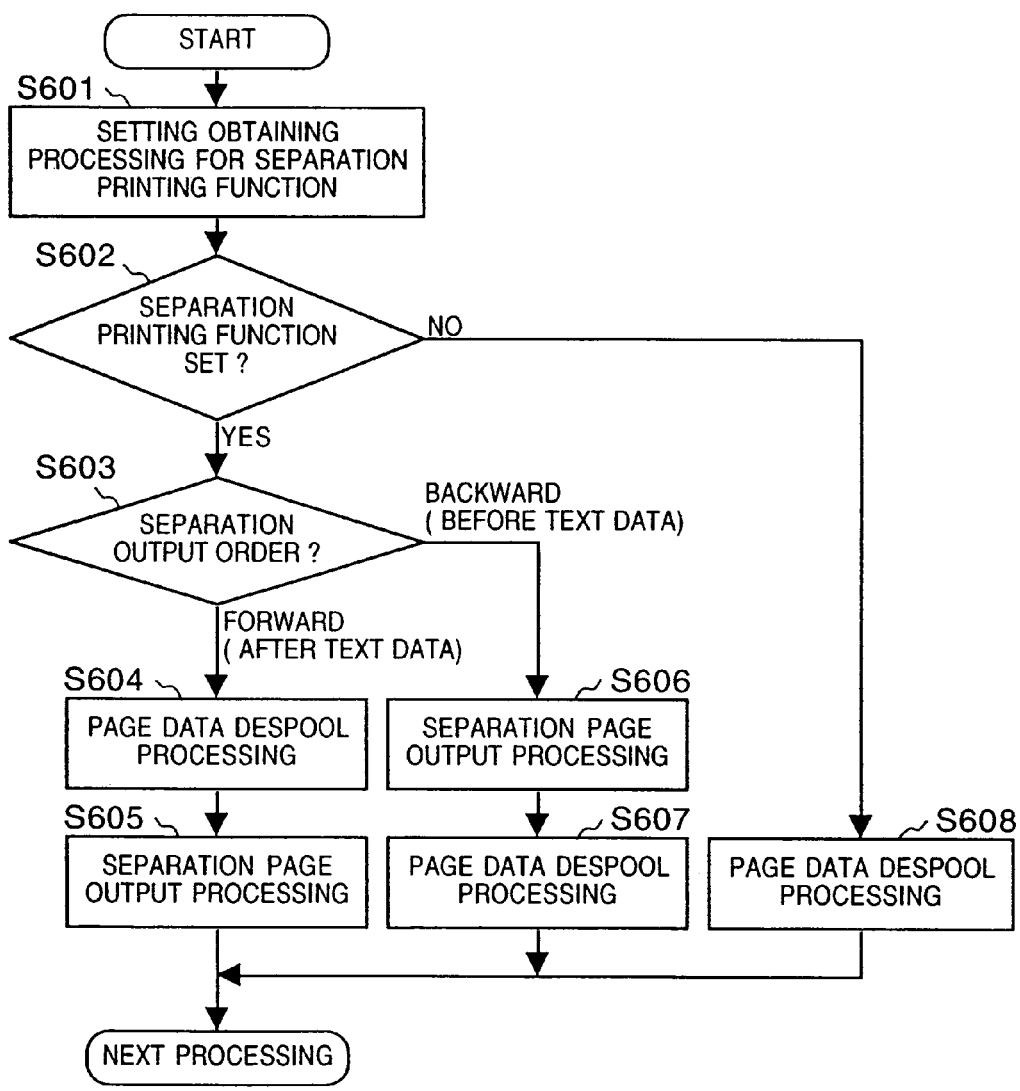
FIG. 4 is a flow chart showing the feature of a processing sequence according to the present invention.

FIG. 4 is a flow chart roughly showing separation paper insertion printing (to be simply referred to as separation printing) processing in the despooler 305. Setting content obtaining processing for separation printing is done (step S601). In this processing, related information including the ON/OFF state of separation paper insertion printing set by a user is obtained via a graphical user interface like the one shown in FIG. 7 that is provided by the printer driver 203 and displayed on the CRT 10.

Figure 7:
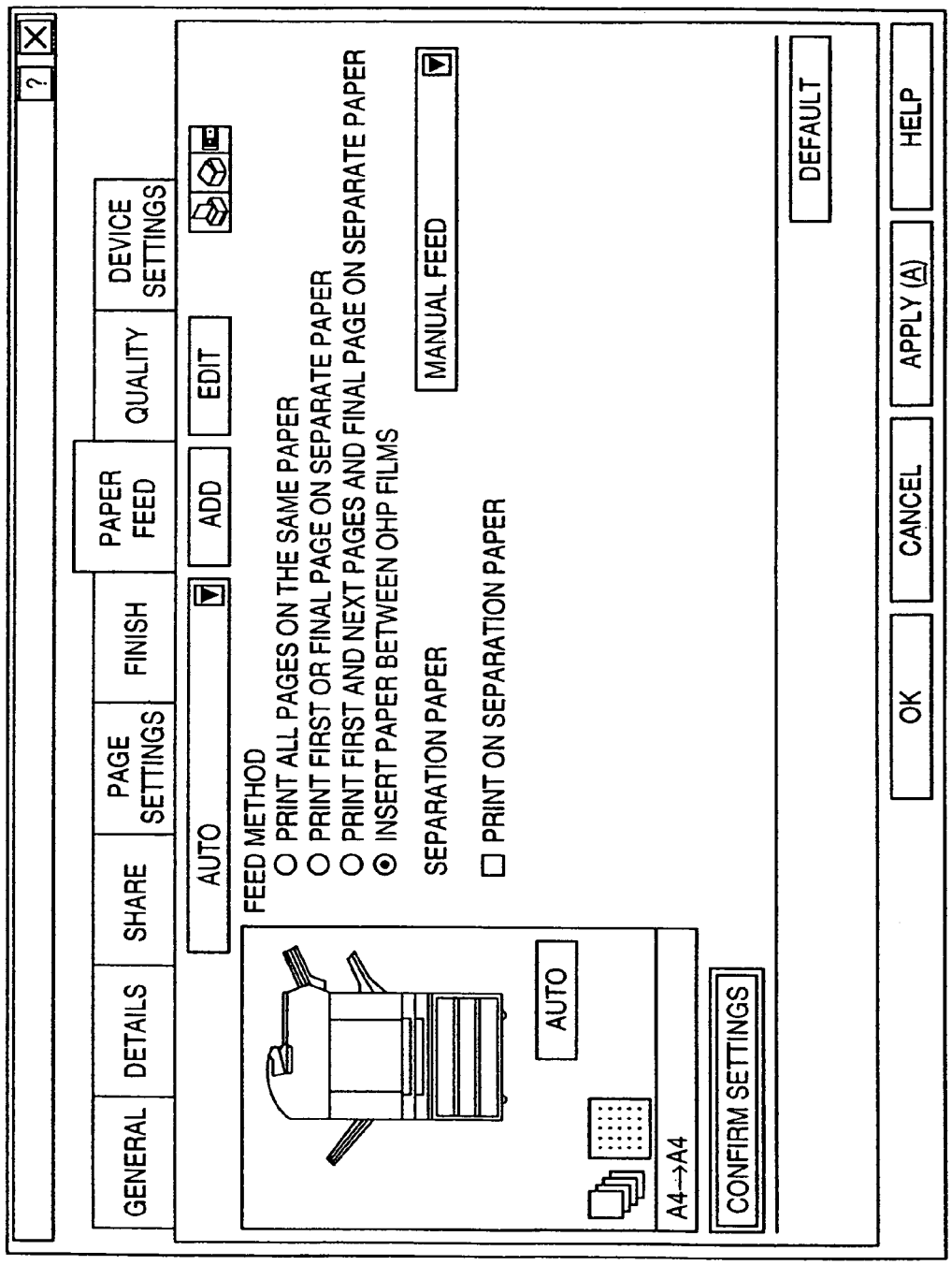
FIG. 7 is a view showing a user interface of a printer driver in the present invention.

A radio button "Insert paper between OHP films" on the setting window of FIG. 7 represents separation paper insertion printing. Since this radio button is checked, separation paper insertion printing is set on. It is also set that separation paper is fed from a manual feed tray and output as blank paper because a check box "Print on separation paper" is not checked.

Settings on the driver interface are obtained via the spooler 302 where the settings are spooled. The spooled settings are obtained by the despooler 305. Based on the obtained information, whether the separation printing function is set is determined (step S602). Since separation printing is set, the separation output order flag is determined (step S603).

The separation output order flag represents a printing order set from, e.g., an application setting window for instructing printing or from a window different from the driver setting window shown in FIG. 7 (in FIG. 7, a "paper feed" tag is selected, and if the user selects another tag, another setting window is displayed.) The contents of the flag are obtained from the driver via the spooler, similar to the ON/OFF state of separation printing. It is determined whether separation paper is despooled before or after output page data (in other words, separation paper is output before or after an OHP sheet).

In step S603, for example, the information processing system can set backward printing. When separation paper is to be output before an OHP sheet from the printer, the backward printing is set. "Before output page data of the text" is selected on the basis of the output order flag. In this case, backward printing is set, and thus a flag corresponding to "Before output page data of the text" is set. Hence, blank separation page despool processing is done in accordance with the above-described settings (step S606), and then page data despool processing (step 607) to output a separation page before page data. Processes in step S603 and subsequent steps are repeated by the despooler 305 by the number of pages. Sheets of separation paper are inserted between respective pages to obtain output results.

When forward printing is designated, page data despool processing is done (step S604), and then blank separation page output processing is done (S606) to output a separation page after page data.

When no separation printing is set, the processing shifts from step S602 to step S608 to perform page data despool processing.

Second Embodiment

In the first embodiment, separation paper is set to be output as blank paper without printing any data. In this case, if a printer or printer driver having a conventional blank paper saving function is used without any change, the printer or printer driver does not output any separation paper. To prevent this, the second embodiment realizes normal separation printing even when the printer or printer driver has the blank paper saving function and separation paper is set to blank paper.

Figure 6:
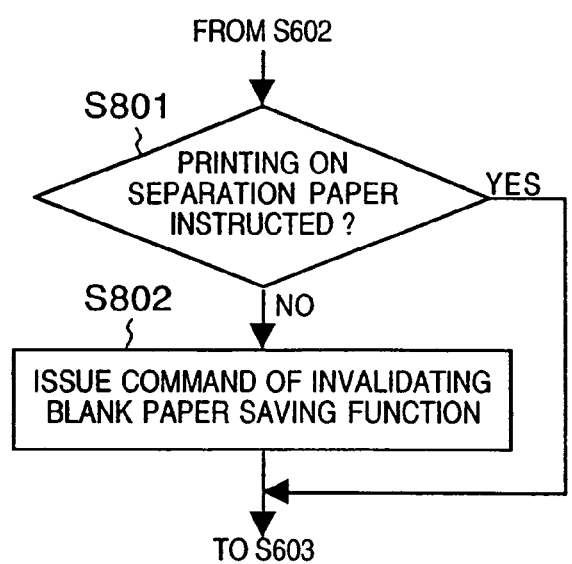
FIG. 6 is a flow chart showing a feature of the processing sequence according to the present invention.

FIG. 6 is a flow chart showing processing according to the second embodiment of the present invention. The second embodiment is realized by inserting processing shown in FIG. 6 between steps S602 and S603 in the first embodiment. The same processing as in the first embodiment will be omitted. Also in the second embodiment, setting contents are shown in FIG. 7. That is, separation paper insertion printing is set on, and separation paper is fed from a manual feed tray and output as blank paper. These setting contents are obtained in step S601, and it is determined in step S602 that the separation printing function is set. After that, the processing shifts to step S801.

In step S801, whether printing on separation paper is instructed is checked. In this case, since separation paper is set to be output as blank paper, command issuing processing of invalidating the blank paper saving function is executed (step S803). If it is set that any data such as the same contents as those of a text page is printed on a separation paper, the separation paper is not output as blank paper. Therefore, the processing skips step S802 and shifts to step S603.

The blank paper saving function is generally given to a printer, and when a page does not have any data to be printed, functions not to output any blank page. In normal printing, this function is set on. In command issuing processing of invalidating the blank paper saving function in step S802, this printer function is set off. More specifically, a command of invalidating the blank paper saving function in, e.g., LIPS:

@PJL SET LPARM : LIPS PAPER-SAVE=OFF is issued to set off the blank paper saving function of the printer. Processes in step S603 and subsequent steps are repeated for all pages to complete printing processing. By setting off the blank paper saving function, print results using a normal separation function can be obtained. After all pages are processed, a command of setting on the blank paper saving function is desirably issued to restore the printer settings.

Other Embodiments

The blank paper saving function is given to a printer in the above-described embodiments, but may be given to a printer driver. In this case, settings of the printer driver are changed instead of issuing a command to the printer.

When separation paper printing cannot be set on a printing setting window or the like, determination processing in step S801 may be omitted, and the blank paper saving function may be immediately set off.

In the above-described embodiments, the separation printing order flag is set in accordance with printing order (forward printing/backward printing), but it may set in accordance with whether the printed sheet is discharged with the printed surface facing up or down.

The present invention may be applied to a system constituted by a plurality of devices (e.g., a host computer, interface device, reader, and printer) or an apparatus comprising a single device (e.g., a copying machine or facsimile apparatus).

The object of the present invention is realized even by causing a computer (or a CPU or MPU) of a system or apparatus to read out and execute program codes stored in a storage medium storing software program codes for realizing the functions of the above-described embodiments.

In this case, the program codes read out from the storage medium realize the functions of the above-described embodiments by themselves, and the storage medium storing the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes readout from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the above storage medium, this storage medium stores program codes corresponding to the above-described flow charts (shown in FIGS. 4 and/or 6).

As has been described above, according to the separation paper insertion printing method and apparatus of the present invention, a system constituted by an information processing apparatus such as a personal computer connected to a printer comprises a spool means for temporarily saving data in a format (so-called intermediate code) different from the format of print data to be finally transmitted to the printer before the information processing apparatus generates the print data to be transmitted to the printer. The system further comprises a despool means for generating print data to be finally transmitted to the printer, from the data temporarily stored in the intermediate code format, and a means for generating a printer control command. Moreover, the system has a function of printing data on OHP films while inserting separation paper in order to prevent the print results of the OHP films from overlapping each other and to serve as layout paper. This system allows a user to designate the order of outputting separation paper. Even in separation printing, the user can obtain desired print results. For example, in backward printing, the user can obtain the same print results as those of forward printing by outputting separation paper before.

In the system further having a blank paper saving function of not printing any page having no print data, when separation paper insertion is designated, the blank paper saving function of the device is invalidated. Thus, even when separation paper is blank, a normal separation paper insertion printing function can be provided.

As many apparently widely different embodiments of the present invention can be made without departing from the spirit and scope thereof, it is to be understood that the invention is not limited to the specific embodiments thereof except as defined in the appended claims.

The invention claimed is:

1. A printing control method of remotely controlling a printing device to output printing data onto a printing medium, comprising:

a print setting step of setting, based on a user input to a paper feed setting screen of a graphical user interface, a separation printing setting and a printing order setting for a print job;

a separation printing check step of checking the separation printing setting representing whether a predetermined medium is additionally output over each printed page of the printing data;

a printing order check step of checking the printing order setting representing whether the printing data is output from a final page or from a first page;

a control step of selectively controlling to (i) output a page of the printing data and then output the predetermined medium before a next page of the printing data is output when the separation printing setting is set to additionally output the predetermined medium and the printing order setting is set to output the printing data from the first page, and (ii) to output the predetermined medium before each printed page of the printing data is output when the separation printing setting is set to additionally output the predetermined medium and the printing order setting is set to output the printing data from the final page;

a saving state check step of checking whether the printing device is set to a saving state in which a page having no output data is not output; and a saving function invalidating step of invalidating setting of the saving state when setting of additionally outputting the predetermined medium is detected in the separation printing check step and setting of the saving state is detected in the saving function check step, wherein the print setting step sets the separation printing setting and the printing order setting with respect to individual print jobs.

2. A printing control method of remotely controlling a printing device to output printing data onto a printing medium, comprising:

a print setting step of setting, based on a user input to a paper feed setting screen of a graphical user interface, a separation printing setting, a layout paper printing setting, and a printing order setting for a print job;

a separation printing check step of checking the separation printing setting representing whether a predetermined medium is additionally output over each printed page of the printing data, and the layout paper printing setting, set in advance, representing whether a predetermined content is to be printed on the predetermined medium;

a printing order check step of checking the printing order setting representing whether the printing data is output from a final page or from a first page;

a control step of selectively controlling to (i) output a page of the printing data and then output the predetermined medium before a next page of the printing data is output when the separation printing setting is set to additionally output the predetermined medium and the printing order setting is set to output the printing data from the first page, and (ii) to output the predetermined medium before each printed page of the printing data is output when the separation printing setting is set to additionally output the predetermined medium and the printing order setting is set to output the printing data from the final page;

a saving state check step of checking whether the printing device is set to a saving state in which a page having no output data is not output; and a saving function invalidating step of invalidating setting of the saving state when the separation printing setting is set to additionally output the predetermined medium, and the layout paper printing setting is set off, wherein the print setting step sets the separation printing setting and the printing order setting with respect to individual print jobs.

3. The method according to claim 2, wherein the predetermined content is the same as content printed on each page of the output.

4. A printing control apparatus for controlling a printing device to output printing data onto a printing medium, comprising:

print setting means for setting, based on a user input to a paper feed setting screen of a graphical user interface, a separation printing setting and a printing order setting for a print job;

separation printing check means for checking the separation printing setting representing whether a predetermined medium is additionally output over each page of the output predetermined data;

printing order check means for checking the printing order setting representing whether the predetermined data is output from a final page or from a first page;

control means for selectively controlling to (i) output each page of the printing data and then output the predetermined medium before a next printed page is output when the separation printing setting is set to additionally output the predetermined medium and the printing order setting is set to output the printing data from the first page, and (ii) output the predetermined medium before each page of the printing data is output when the separation printing setting is set to output the predetermined medium and the printing order setting is set to output the printing data from the final page;

saving state check means for checking whether the printing device is set to a saving state in which a page having no output data is not output; and saving function invalidating means for invalidating setting of the saving state when setting of additionally outputting the predetermined medium is detected by said separation printing check means and setting of the saving state is detected by said saving function check means, wherein the print setting means sets the separation printing setting and the printing order setting with respect to individual print jobs.

5. A printing control apparatus for remotely controlling a printing device to output printing data onto a printing medium, comprising:

print setting means for setting, based on a user input to a paper feed setting screen of a graphical user interface, a separation printing setting, a layout paper printing setting, and a printing order setting for a print job;

separation printing check means for checking the separation printing setting representing whether a predetermined medium is additionally output over each page of the output predetermined data, and the layout paper printing setting, set in advance, representing whether a predetermined content is to be printed on the predetermined medium;

printing order check means for checking the printing order setting representing whether the predetermined data is output from a final page or from a first page;

control means for selectively controlling to (i) output each page of the printing data and then output the predetermined medium before a next printed page is output when the separation printing setting is set to additionally output the predetermined medium and the printing order setting is set to output the printing data from the first page, and (ii) output the predetermined medium before each page of the printing data is output when the separation printing setting is set to output the predetermined medium and the printing order setting is set to output the printing data from the final page;

saving state check means for checking whether the printing device is set to a saving state in which a page having no output data is not output; and saving function invalidating means for invalidating setting of the saving state when the separation printing setting is set to additionally output the predetermined medium, and the layout paper printing setting is set off, wherein the print setting means sets the separation printing setting and the printing order setting with respect to individual print jobs.

6. The apparatus according to claim 5, wherein the predetermined content is the same as content printed on each page of the output.

* * * * *

UNITED STATES PATENT AND TRADEMARK OFFICE
CERTIFICATE OF CORRECTION

PATENT NO. : 7,027,170 B1 Page 1 of 1
APPLICATION NO. : 09/470204
DATED : April 11, 2006
INVENTOR(S) : Satoshi Nishikawa et al.

It is certified that error appears in the above-identified patent and that said Letters Patent is hereby corrected as shown below:

Column 9
Line 64, "readout" should read --read out--.

Signed and Sealed this

Twentieth Day of February, 2007

JON W. DUDAS
*Director of the United States Patent and Trademark Office*